Dec. 26, 1939.  L. P. NICHOLS  2,184,360

VISOR ATTACHMENT

Filed May 5, 1939

INVENTOR
LEWIS P. NICHOLS
BY
Hyde, Higley & Mayer
ATTORNEYS

Patented Dec. 26, 1939

2,184,360

UNITED STATES PATENT OFFICE 2,184,360

VISOR ATTACHMENT

Lewis P. Nichols, Cleveland, Ohio

Application May 5, 1939, Serial No. 271,838

4 Claims. (Cl. 296—97)

This invention relates to improvements in visor attachments useful in connection with glare shields on automobiles and other vehicles. More particularly the invention relates to a visor adapted to be attached to a standard visor or glare shield such as is commonly used in automobiles today.

An object of the present invention is to provide an auxiliary visor which may be quickly attached to a standard glare shield and which is adjustable in a number of different directions so as to facilitate the positioning of the auxiliary visor in any of a number of positions where it augments or complements the standard visor to give protection to the eyes of the driver.

Another object of the invention is to provide a detachable visor of the type described which is cheaply and easily constructed and which is designed to resist warping.

Other objects and advantages of the present invention will appear from the accompanying specification and drawing and the essential features thereof will be set forth in the claims.

Figure 1:
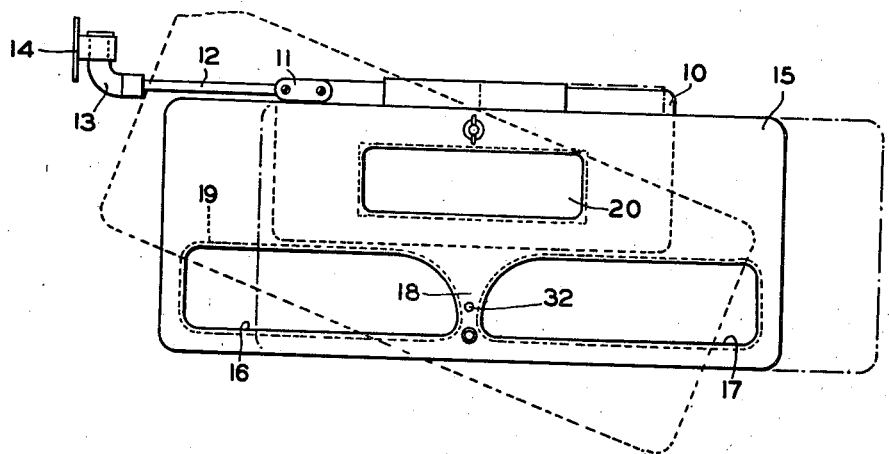
Figure 2:
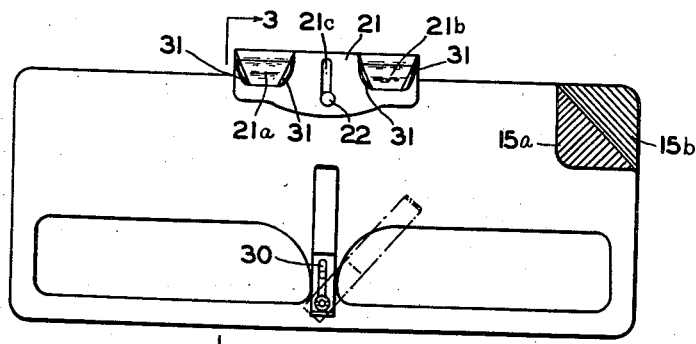
Figure 3:
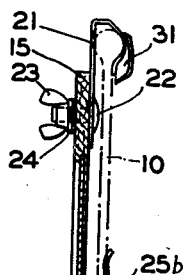
Figure 4:
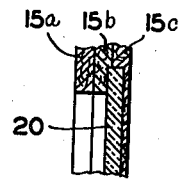

In the drawing, Fig. 1 is a view of the front face of my improved visor, that is, the face toward the driver with the visor supported on a standard glare shield and with adjusted positions indicated in dot-dash and in broken lines; Fig. 2 is a rear view of the device of Fig. 1 showing the detachable visor alone; Fig. 3 is an enlarged sectional view taken along the line 3—3 of Fig. 2; while Fig. 4 is a further enlargement of a small portion of the device of Fig. 3.

My improved visor is designed for attachment to any of the standard visors or glare shields now found commonly in use on automobiles and positioned generally just inside of the windshield toward the top thereof and movable into and out of shielding position in front of the driver. One form of such glare shield is indicated at 10 in Fig. 1, as comprising a substantially rectangular opaque shield connected by bracket 11 and rod 12 with a supporting arm 13 mounted for rotation about a vertical axis in a bracket 14 which is secured to the side wall of the vehicle. It will be understood that the rod 12 is rotatable about a horizontal axis in the fixture 13 so that the glare shield has movement in two directions about its support. With standard glare shields there is little adjustment to the right or left or in a vertical direction so that the glare from the sun, the road, headlights, etc., coming toward the driver at various angles is not shielded by the standard equipment. An object of the present invention therefore is to provide an auxiliary visor 15 which is quickly attached to the standard shield 10 and adjustable relative thereto so as to overcome the deficiencies of the standard equipment.

The visor 15 shown herein is substantially rectangular in shape and is a composite sheet made up of a plurality of opaque laminations 15a, 15b, 15c, adhesively secured together to form a cheap but strong structure. Preferably I use a fiber material having a definitely oriented grain structure and adjoining laminations are secured together with the grain or fiber structure of one lamination lying at an angle to the fiber structure of another lamination as indicated at Fig. 2 where the top lamination 15a is shown folded over at the corner with grain structure indicated by the parallel lines showing how the two cross each other in adjoining laminations. This gives a very strong sheet and one which resists warping.

Near the bottom of the sheet 15 are provided a pair of window openings 16 and 17 with a separating strip 18 of the opaque material between them. The windows 16 and 17 are filled with colored "pyralin," glass, "celluloid" or similar transparent material adapted to protect the eyes of the driver from undesirable glare. For instance an amber or green color is suitable. Preferably such window material which is indicated at 19 as a sheet of "pyralin" has its edges secured between laminations of the sheet 15 which is a very cheap but efficient manner of forming the structure.

Preferably my improved visor carries a mirror 20 on the face of the visor toward the driver and in position to act as a rear-view mirror. This is desirable because either the standard glare shield 10 or my more extensive visor 15 is apt to obscure the standard rear-view mirror. Preferably the mirror 20 as indicated in Fig. 4 has its edges secured between laminations of the sheet 15 with openings through the laminations 15a and 15b as shown to expose the face of the mirror toward the driver. It will be understood, however, that any other manner of fastening the mirror on the visor is within the scope of my invention. By placing the mirror in the center of the visor, I may use the same style visor on either the right or left side of a vehicle.

Novel means is provided for supporting the visor 15 on the standard glare shield or visor 10. To this end I provide downwardly opening hook means 21 secured near the upper edge of the visor 15 and adapted to hook over the upper edge of the shield 10. The hook means 21 is sufficiently wide to support the visor 15 without tilting and to this end I have shown a pair of separated hook parts 21a and 21b. The hook means 21 is so arranged that the visor 15 slides radially in a horizontal direction along the top horizontal edge of the shield 10. By having the opening between hook parts 21a and 21b, the visor 15 is prevented from turning or tilting when it is so far to one side that only one of such hook parts engages the glare shield 10. Each hook part 21a and 21b has its lateral edges turned up as at 31 to prevent wearing or tearing of the shield 10 as the visor 15 is moved sidewise.

The portion of the hook means 21 in contact with the visor 15 carries a vertical slot 21c which registers with a suitable round opening in the visor 15. Through this opening and slot is passed a bolt 22 to which is secured a wing nut 23 which may be screwed down on the bolt preferably with a lock washer 24 to hold the parts in locked position. The bolt and wing nut then secure the hook means 21 and the visor 15 in any desired position. It is obvious, for instance, that relative vertical adjustment between the hook means 21 and the visor 15 is provided by the slot 21c. It is also obvious that the visor 15 may be swung about the bolt 22 to any angular position desired as for instance that indicated in dash lines in Fig. 1. Such adjustment would bring the window 17 in a lower position than is otherwise possible which might be necessary for a short driver or if the glare were coming from a low point on the right side. Obviously also the visor 15 may be tilted in any manner desired about the bolt 22 whether the visor 15 be adjusted to any of its vertical positions in slot 21c or whether it be adjusted in a horizontal direction as indicated by the dot-dash position of Fig. 1.

To further secure the visor 15 to the shield 10 I provide an upwardly opening hook 25 near the lower edge of the visor 15 and adapted to engage the lower edge of the shield 10. Preferably this hook 25 is secured to the portion 18 of the visor 15 lying between the windows 16 and 17. The hook has a flat portion 25a lying next to the visor and the offset portion 25b substantially parallel thereto but adapted to press tightly against the shield 10 as indicated in Fig. 3. As here shown the full line position of the hook 25 is its normal position and when clamped against the shield 10 it will be obvious that the shield will force the hook 25 outwardly so that the hook is under a strain to clamp the visor 15 to the shield 10. I provide novel means for pressing the hook 25 against the shield 10. This is best shown in Fig. 3 as comprising a split pin 26 passing through registering openings in the visor 15 and the hook 25. Washers 27 and 28 lie on opposite sides of the visor and the end of the pin 26 at 26a is bent over on the washer 28. A spring 29 is compressed between the head of pin 26 and the washer 27 so that it pushes pin 26 toward the left as viewed in Fig. 3 holding hook portion 25a tightly against the visor 15. It will be understood that I may use here the same type of fastening as shown at 22, 23 if desired. The hook 25 may be swung about pin 26 to the broken line position of Fig. 2 for unlocking purposes. The hole 32 permits movement of pin 26 to that location, if desired, thus moving hook 25 nearer to hook 21. A slot 30 in hook 25 permits vertical adjustment of hook 25 relative to the visor 15 to accommodate various widths of visors 10. Preferably sufficient clearance is provided as indicated in Fig. 3 between the lower edge of shield 10 and the portion 25c of the hook 25 to permit tilting of the visor 15 to a position such as that shown in dash lines in Fig. 1.

I have thus provided an auxiliary visor which is cheaply but strongly made and quickly and easily attached to a standard glare shield 10 and quickly adjusted relative thereto to all of the various positions described.

So far as I know, I am the first to provide a visor detachably mounted on a glare shield and which is adjusted to so many positions outside the field of the standard glare shield to provide an opaque shield for stopping the sun's rays, together with the colored window below it. The colored window itself aids in stopping the rays of the sun but is chiefly useful to cut down other glare if the opaque portion of visor 15 is adjusted to stop the direct rays of the sun.

What I claim is:

1. An auxiliary visor for attachment to a vehicle glare shield visor having a horizontally extending top edge comprising a composite sheet partly of opaque material and partly of transparent material, a downwardly facing hook secured to the upper edge of said sheet, said hook having a pin and slot connection with said sheet whereof the slot runs perpendicular to said horizontal edge.

2. An auxiliary visor for attachment to a vehicle glare shield visor having a horizontally extending top edge comprising a composite sheet partly of opaque material and partly of transparent material, a downwardly facing hook secured to the upper edge of said sheet, said hook having sufficient width to prevent tilting of said sheet relative to its supporting visor, said hook having a portion engaging said sheet, said portion having a slot extending vertically, there being a registering opening in said sheet, a bolt passing through said slot and opening and a nut on said bolt securing said hook to said sheet in various adjusted positions.

3. An auxiliary visor for attachment to a vehicle glare shield visor, there being a downwardly facing hook secured to the upper edge of said auxiliary visor whereby the latter may be hung on the upper edge of said glare shield visor, and there being an upturned hook secured near the lower edge of said auxiliary visor in position to grip the lower edge of said glare shield visor, and at least one of said hooks being adjustable toward and from the other hook.

4. An auxiliary visor for attachment to a vehicle glare shield, there being a hook pivotally secured to said visor, said hook having a portion substantially parallel to said visor, said hook being swingable about its pivotal connection into and out of clamping position, and spring means pressing said hook portion toward said visor to clampingly retain said visor in position on said glare shield.

LEWIS P. NICHOLS.